United States Patent
Yoneyama

(10) Patent No.: US 6,783,249 B2
(45) Date of Patent: Aug. 31, 2004

(54) PROJECTION-TYPE IMAGE DISPLAY DEVICE

(75) Inventor: Kazuya Yoneyama, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 0 days.

(21) Appl. No.: 10/722,471

(22) Filed: Nov. 28, 2003

(65) Prior Publication Data

US 2004/0141160 A1 Jul. 22, 2004

(30) Foreign Application Priority Data

Nov. 27, 2002 (JP) ........................................ 2002-343680

(51) Int. Cl.[7] ............................................. G03B 21/14
(52) U.S. Cl. ........................ 353/98; 353/119; 348/771
(58) Field of Search .............................. 353/98, 99, 34; 348/742, 743, 771; 349/5, 7, 8, 9

(56) References Cited

U.S. PATENT DOCUMENTS

| | | | |
|---|---|---|---|
| 6,491,398 B2 | | 12/2002 | Takeuchi et al. |
| 6,601,959 B2 | * | 8/2003 | Miyata et al. ................. 353/98 |
| 6,705,734 B1 | * | 3/2004 | Barazza ......................... 353/98 |
| 2002/0118310 A1 | * | 8/2002 | DeLong ....................... 348/771 |
| 2002/0118343 A1 | * | 8/2002 | Lee .............................. 353/84 |

* cited by examiner

*Primary Examiner*—William C. Dowling
(74) *Attorney, Agent, or Firm*—Arnold International; Jon W. Henry; Bruce Y. Arnold

(57) ABSTRACT

A projection-type image display device includes a light source, converging optics, a rod integrator having a first optical axis, a light deflecting structure, and a light beam separating structure. The light beam separating structure directs light to a digital micromirror device and modulated light from the digital micromirror device along a second optical axis of a projection lens that projects an image formed by the modulated light on a screen. The rod integrator is between the light beam separating structure and the projection lens in the direction of the second optical axis and is outside the optical path of the modulated light beam from the digital micromirror device. The rod integrator may include a solid rod member and a leaky ray shielding member at least one of the entrance end, the exit end, and around the solid rod member. The converging optics may include a parabolic reflector and an aspheric lens.

20 Claims, 5 Drawing Sheets

PROJECTION-TYPE IMAGE DISPLAY DEVICE

BACKGROUND OF THE INVENTION

One known projection-type image display device includes an optical system with a digital micromirror device (hereinafter DMD), which is used as an image display element, and a rod integrator. An embodiment of such a known device is described in Japanese Laid-Open Patent Application 2000-206452 and is shown in FIG. 5 of that Laid-Open Patent Application.

Compactness is one of the design criteria for such projection-type image display devices. However, various requirements of such projection-type image display devices limit the compactness of such devices. For example, it is desirable that all the optical elements of the projection-type image display device be on one side of the image display element so that the space on the other side of the image display element is reserved for electrical components. The image display element is mounted on one side of a board and the electrical components are mounted on the other side of the board. It is convenient to have all of the optical elements on one side of the board and all of the electrical components on the other side so that changes in board configuration do not affect the design of the optical elements.

A prior art projection-type image display device includes a projection lens with a shift mechanism for shifting the projection lens in the direction of its optical axis in order to place the projection lens in a desired position so as to provide a bright projected image. A totally reflecting prism is used to illuminate the DMD at an angle of about forty-five degrees and to assist in making the arrangement of the projection lens telecentric.

The properties of a projection-type image display device, such as the specifics of the type of lamp, the F-number of the condenser lens, the size of the rod integrator, and the magnification of the relay optics, are determined for efficient use of the light for forming a bright projected image and to allow freedom in designing the configuration of the projection-type image display device for compactness.

FIG. 3 shows a top view of a known projection-type image display device having a three-dimensional displacement of the light beam. FIG. 4 shows a back view of the projection-type image display device of FIG. 3.

As shown in FIGS. 3 and 4, a light beam (not shown) is reflected by a parabolic reflector 51 and is converged near the entrance end of a rod integrator 55 by a condenser lens 53. The illumination light beam entering the rod integrator 55 is separated into color components in a time-division manner by a color wheel 54 that is positioned near the entrance end of the rod integrator 55. With the light beam intensity homogenized by the rod integrator 55, the illumination light beam is directed into a totally reflecting prism 61, which includes two prisms 60a and 60b, via relay lenses 58a and 58b and mirrors 59a and 59b. The totally reflecting prism 61 totally reflects the incident illumination light beam so as to guide the light to a DMD 62 and then transmits the light beam that is reflected from the DMD to a projection lens 64. Totally reflected on the inner totally reflecting surface of the totally reflecting prism 61, the illumination light beam is incident onto the DMD 62 via a cover glass 63. The light beam that is optically modulated by the DMD 62 in accordance with image signals corresponding to color components in a time-division manner is transmitted through the totally reflecting prism 61 and the projection lens 64 so as to form a magnified image on a screen (not shown).

The prior art projection-type image display device described above is compact. However, recent demands for improved brightness necessitate the use of more powerful light sources and larger reflectors, leading to relatively larger projection-type image display devices and larger optical elements, including larger projection lenses. In order to avoid an increase in overall size, projection-type image display devices must be designed with a configuration different from the prior art configuration described above.

Additionally, recently, projection-type image display devices for individual use have been developed and a so-called home theater market has emerged. For the home theater market, having an appearance that coordinates with other interior designs is often as important as functionality. In this regard, it is desired that the projection-type image display device be thin in a direction that is orthogonal to the optical axis of the projection lens. This direction corresponds to the height of the device and is the vertical direction in FIG. 4.

BRIEF SUMMARY OF THE INVENTION

The present invention relates to a projection-type image display device that uses a DMD as an image display element, is thin in a specified desired direction, and provides efficient use of light so as to obtain a bright projected image. The bright projected image is achieved by selected placement of a circuit board that mounts the DMD, by limiting the incident angles of light to the DMD, and by the design of the relay optics.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
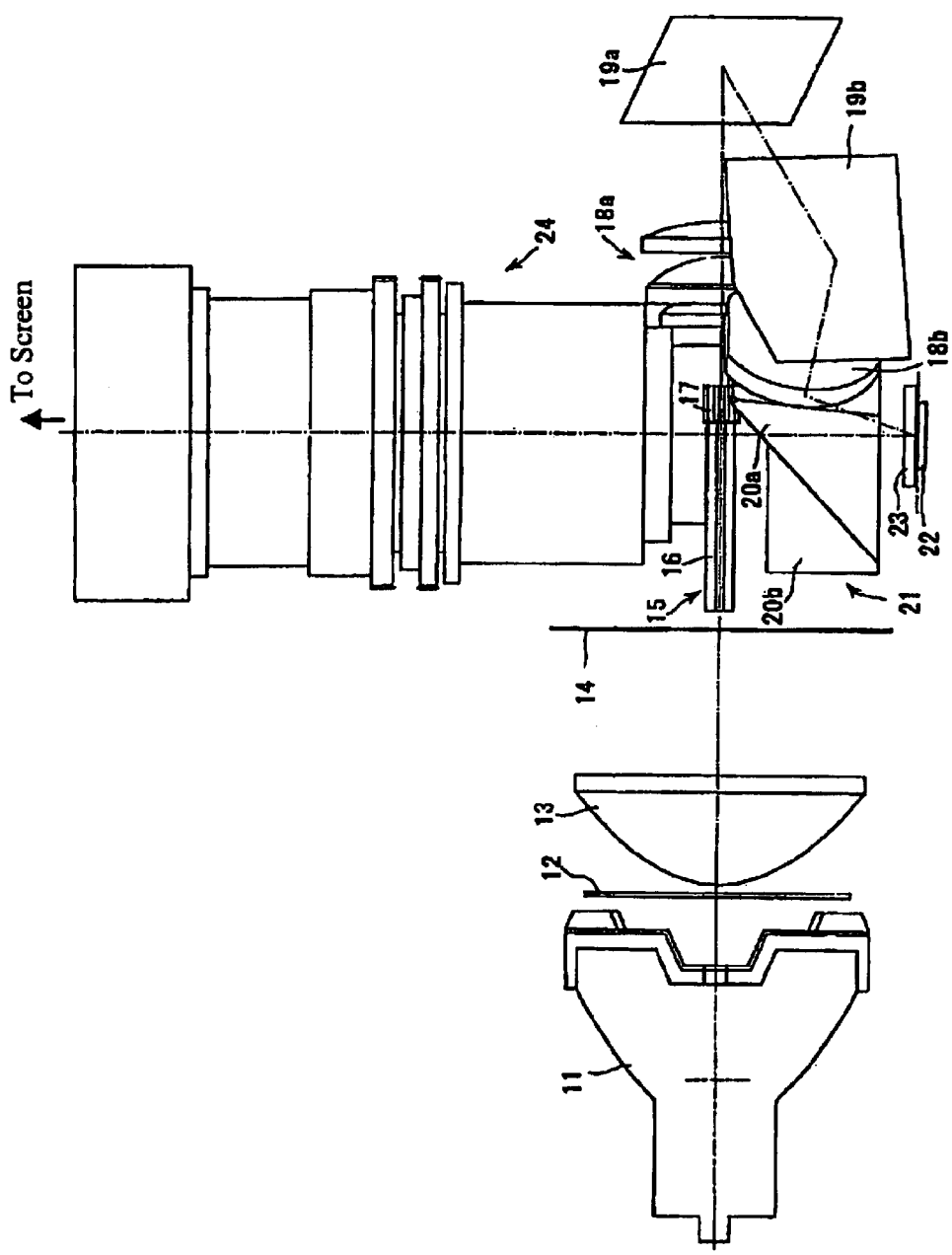
FIG. 1 shows a top view of a projection-type image display device of the present invention.
Figure 2:
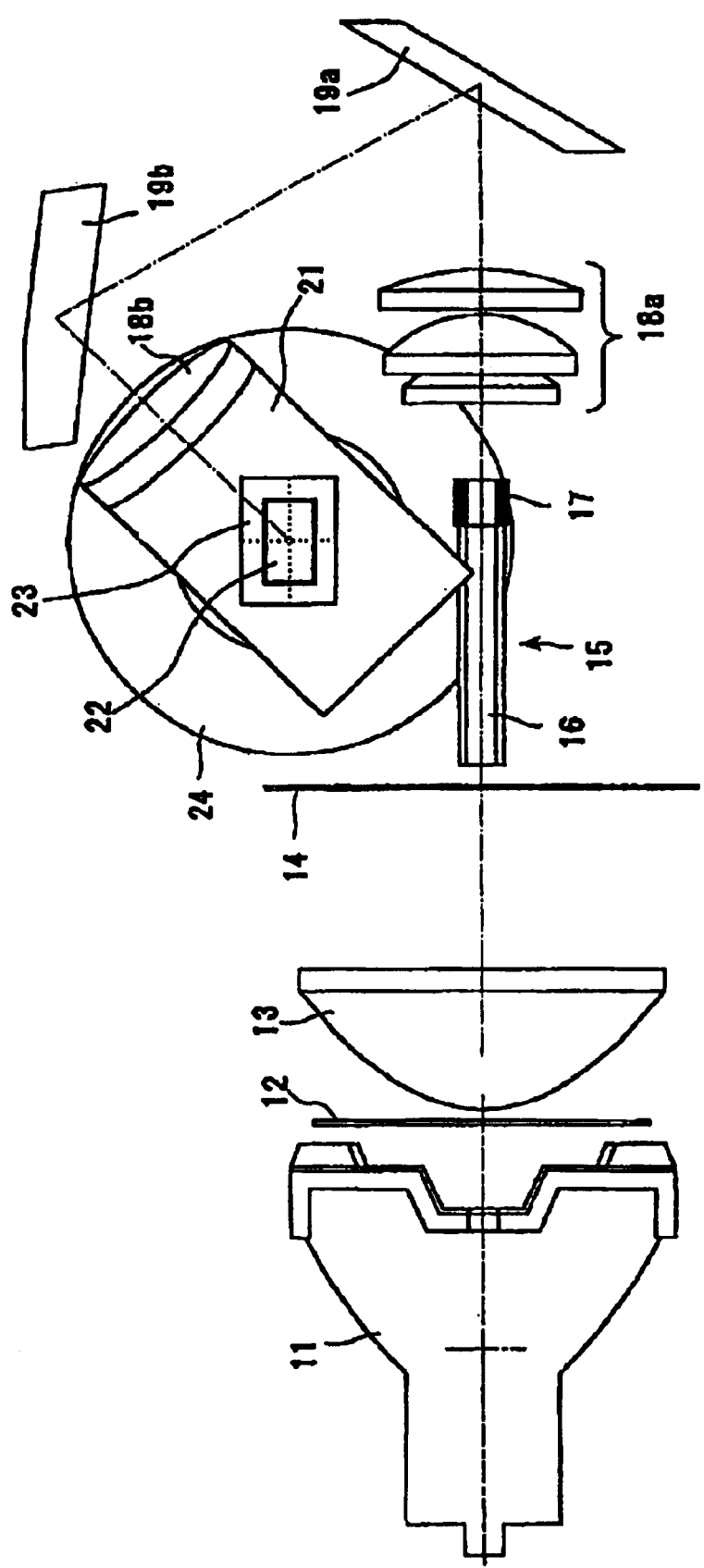
FIG. 2 shows a back view of the projection-type image display device of FIG. 1.

An embodiment of a projection-type image display device of the present invention will first be described with reference to FIGS. 1 and 2. FIG. 1 shows a top view of the embodiment. FIG. 2 shows a back view of the embodiment.

As shown in FIGS. 1 and 2, the projection-type image display device includes a DMD 22 that serves as an image display element. The DMD 22 is a plate-like element and includes an extremely large number of similarly constructed micromirror elements in an array. Each micromirror element has a mirror surface, and the array of micromirror elements defines a composite mirror surface in the DMD plane. Each of the micromirror elements corresponds to a pixel of an image. The reflection direction for each of the micromirror elements is independently switchable so as to rotate between two angular positions, ON and OFF, in order to reflect light in two different directions depending on the ON/OFF control of a picture signal that is sent to each micromirror element. Thus, the incoming light is alternately directed either in a first direction or in a second direction that differs from the first direction by an angle of approximately forty degrees.

Illumination light that is emitted from a white light source is reflected by a reflector 11 in a forward direction (i.e., toward the right in FIG. 1). The reflector 11 is a parabolic mirror having a light source positioned at its focal point so that the light is collected and a substantially collimated light beam is projected from the reflector 11. The illumination light beam passes through a UV-IR filter 12 that filters out infrared and ultraviolet light that emerges from the reflector 11. The illumination light then enters a condenser lens 13 that converges the light at the light entrance end of a rod integrator 15. The cross-sectional light beam intensity of the illumination light beam is homogenized by the rod integrator 15, as will be described later. The illumination light beam entering the rod integrator 15 is separated into color components in a time-division manner by a color wheel 14 that is positioned near the light entrance end of the rod integrator 15.

The illumination light beam emerges from the light exit end of the rod integrator 15 with a nearly uniform cross-sectional intensity. Then, the illumination light beam enters a totally reflecting prism 21 via relay optical systems 18a and 18b that are positioned so that the light exit end of the rod integrator 15 and the composite mirror surface of the DMD 22 are at conjugate points (i.e., each lie at the other's image). Mirrors 19a and 19b also deflect the illumination light in specified directions, as will be described later.

The totally reflecting prism 21 includes prisms 20a and 20b that direct the illumination light beam to the DMD 22 for modulation by the DMD and then direct the modulated light beam from the DMD 22 in a specified direction to a projection lens 24. The illumination light entering the prism 20a is totally reflected due to an air-gap effect at the bonded interface of the prisms 20a and 20b so that the illumination light is directed to the DMD 22.

The illumination light beam is transmitted through a cover glass 23 and is optically modulated in a time-division manner by the DMD 22 in accordance with image signals corresponding to color components. The light beam reflected in a first direction, which is the direction of the projection light beam, is transmitted through the bonded interface of prisms 20a and 20b and enters projection lens 24 so as to form a magnified image on a screen (not shown).

As shown in FIGS. 1 and 2, the rod integrator 15 between the projection lens 24 and the totally reflecting prism 21 is positioned away from the optical path of the illumination light beam that is modulated and directed to the projection lens 24 by the DMD 22. The space between the projection lens 24 and the totally reflecting prism 21 is small, being slightly more than ten millimeters. However, the rod integrator 15 can be positioned in this space without blocking the projection light beam. In general, the projection lens 24 has its larger diameter lenses on the screen side and its smaller diameter lenses on the DMD side. Thus, the rod integrator 15 can be positioned close to the optical axis of the projection lens 24 without blocking the projection light beam. In some cases, it can be positioned so close that it overlaps the lenses on the screen side when seen from the back, as shown in FIG. 2.

The above-described configuration is realized by providing mirrors 19a and 19b for deflecting the illumination light beam so that the optical axes of the rod integrator 15 and the projection lens 24 are skewed relative to one another.

Additionally, as shown in FIG. 1, the mirrors 19a and 19b are arranged so that the illumination beam is deflected at each of the mirrors so that the deflection angle at each mirror has the larger of two orthogonal components in a plane that is perpendicular to the optical axis of the projection lens. That is, the mirrors 19a and 19b primarily reflect the illumination beam in directions perpendicular to the plane of FIG. 1, but also, together they provide a slight downward movement of the illumination beam, as shown in FIG. 1. In this way, the projection-type image display device of the present invention makes efficient use of the space in a direction orthogonal to the optical axis of the projection lens, namely, the vertical direction in FIG. 2, which generally corresponds to the height direction. Thus, this configuration allows the device to have a thin body.

The mirrors 19a and 19b operate as light beam deflecting means for deflecting the illumination light beam as desired from the rod integrator 15 to the totally reflecting prism 21. The totally reflecting prism 21 operates as a light beam separating means for directing the light beam from the light beam deflecting means to the digital micromirror device, and for directing the light beam that is directed to the digital micromirror device and modulated by the digital micromirror device along the second optical axis toward the projection lens.

Figure 3:
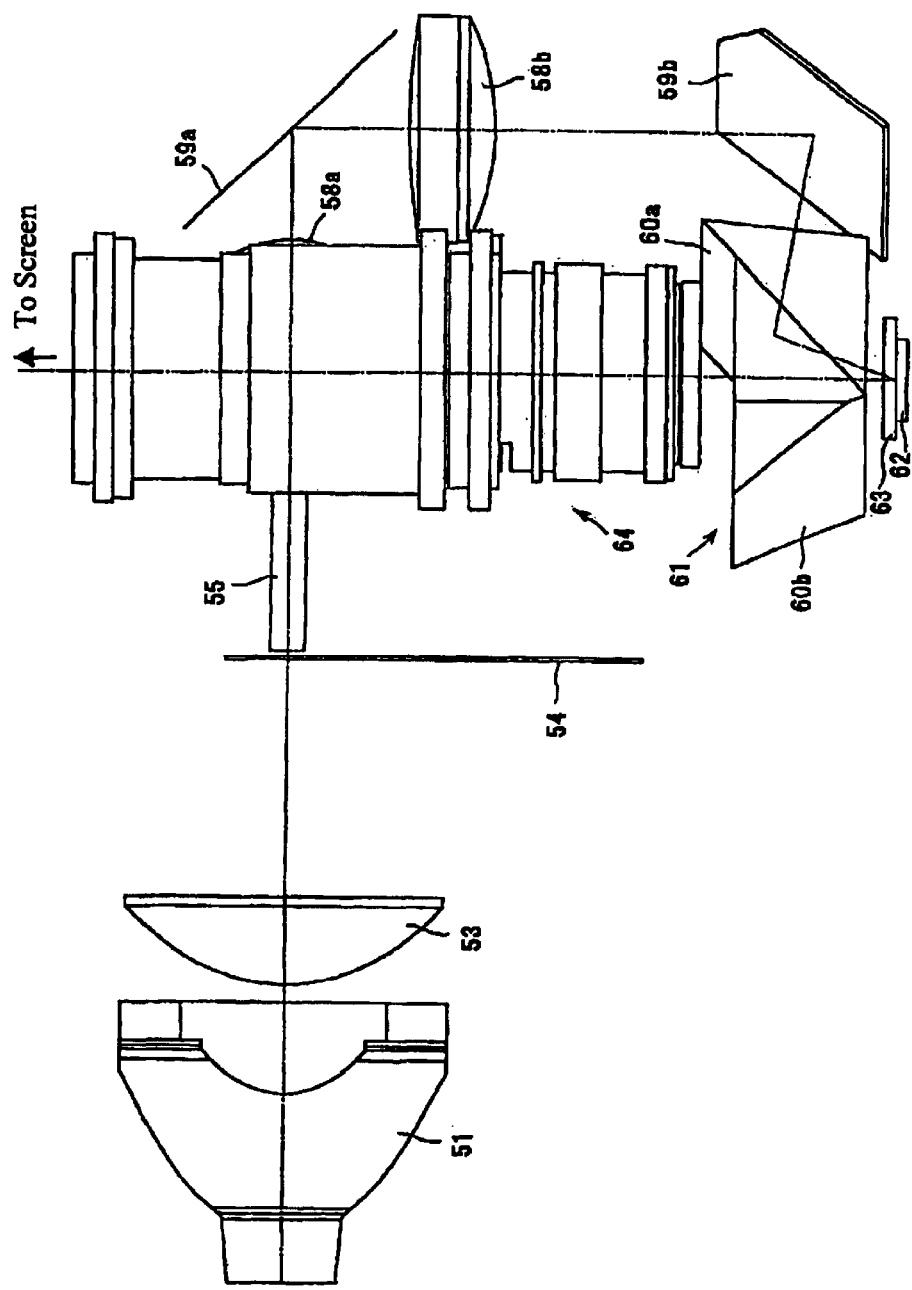
FIG. 3 shows a top view of a known projection-type image display device.
Figure 4:
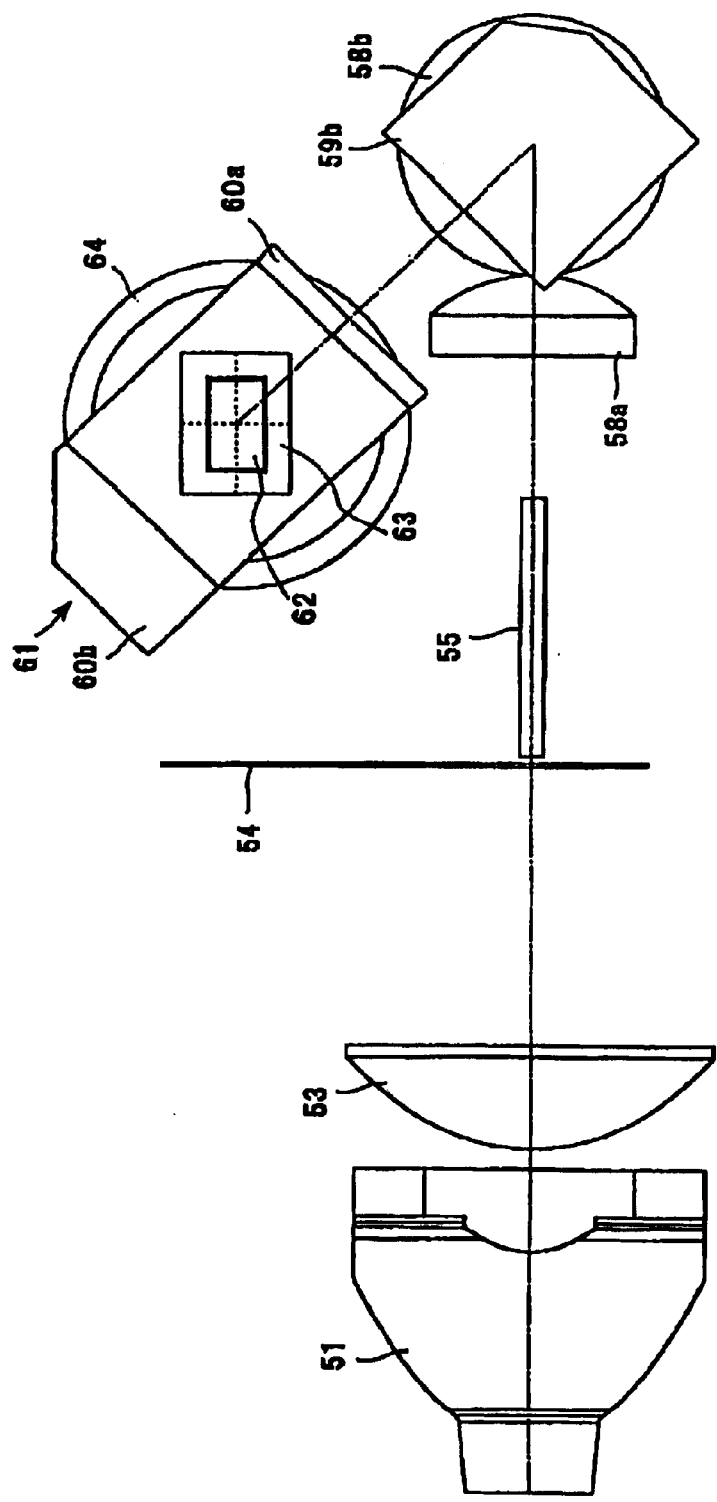
FIG. 4 shows a back view of the projection-type image display device of FIG. 3.

The present invention obviously has a thinner body than the prior art device shown in FIGS. 3 and 4. The device of the present invention shown in FIGS. 1 and 2 and the prior art device are shown in different scales due to space limitation. However, both devices are supposed to generally have elements, including the DMD 22 or 62, of the same size. The device of the present invention has a larger light source reflector and a larger projection lens and thus is brighter than the prior art device, while having a similar size in the height direction as the prior art device. Therefore, the device of the present invention would have a relatively thinner body and would obviously be more compact if the same light source as in the prior art device were used.

In the present embodiment, as-shown in FIG. 1, the rod integrator 15 is positioned between the projection lens 24 and the totally reflecting prism 21, the light source and the condenser lens 13 are positioned on the left side of the projection lens 24, and the relay optical systems 18a and 18b and the mirrors 19a and 19b are positioned on the right side of the projection lens 24. This configuration in which the projection lens is placed near the center of the device helps improve freedom of product design over the prior art configuration in which the projection lens is placed on one side (e.g., on the right side in FIG. 3). Additionally, distributing various elements on both sides of the projection lens 24 helps improve the appearance of the projection-type image display device, which is important for a home theater system.

The configuration of the present embodiment described above satisfies the following design conditions. As shown in FIG. 1, all the optical parts are positioned on the projection lens side of the DMD 22. Therefore, great freedom is allowed in placement of electrical components in the space on the back of a DMD board. With the angles of the reflecting mirrors 19a and 19b appropriately determined, the illumination light beam from the totally reflecting prism falls on the DMD obliquely at an angle of forty-five degrees. Additionally, a telecentric projection lens having a shift mechanism can be used to improve freedom of placement of the projection lens. Furthermore, the configuration of the present embodiment enables positioning a relay optical system to achieve highly efficient use of the light.

The efficacy described above can be obtained when the rod integrator 15 is positioned between the projection lens 24 and the totally reflecting prism 21 without blocking the projection light beam and with the optical axes of the integrator 15 and the projection lens 24 being in different planes. It is more desired that these two optical axes be in two different planes which are parallel, and that these optical axes, when extended and projected onto a common plane that is parallel to those two different parallel planes, cross substantially orthogonally. FIG. 1 shows the optical axes of the rod integrator 15 and projection lens 24, when extended, crossing substantially orthogonal to each other when their separate, parallel planes are projected onto a common plane (i.e., the plane of the paper). The term "substantially orthogonal" as used herein is defined as 90 degrees and those variations from 90 degrees which still enable a bright and compact projection-type image display device, as proposed above, to be achieved. For example, "substantially orthogonal" would include crossing angles of 90 degrees plus or minus 10 degrees.

It is somewhat easier to design the device so that, when the optical axes of the rod integrator 15 and the projection lens 24 are extended and their separate parallel planes are projected onto a common parallel plane, the crossing angle is not precisely 90 degrees; however, such an arrangement makes it somewhat more difficult to place the rod integrator 15 in a small space between the projection lens 24 and totally reflecting prism 21 without blocking the projection light beam. Even if the rod integrator 15 is successfully placed and oriented such that the crossing angle when projected onto a common parallel plane is not precisely 90 degrees, such an arrangement tends to make the device thicker than when the crossing angle is precisely 90 degrees.

For more efficient use of the light, the device can be provided with a reflector with an exit surface that is extended in the vertical direction or with a relay optical system at a position that is optimized for the most efficient use of the light. When the crossing angle, as discussed above, is not substantially orthogonal, as defined above, more mirrors or an increased optical path length may be necessary, which detracts from efficiently using the available light.

The rod integrator 15 of the present embodiment is a hybrid integrator that includes an entrance side integrator (rod member 16) and an exit side integrator (hollow prism-shaped member 17) positioned close to each other in order to homogenize the light beam intensity in a cross-section orthogonal to the optical axis at the light exit end of the exit side integrator. The entrance side integrator is a solid rod member 16 formed of a glass rod having a rectangular cross-section defining a rod prism. The exit side integrator is a hollow prism-shaped member 17 that includes four glass plates, with each glass plate having a reflective coating on one surface. The four glass plates are bonded together in a box-shape having a rectangular cross-section with the reflective coating surfaces facing the inside. One end of the solid rod member 16 is slightly inserted into the hollow prism-shaped member 17.

The rod integrator 15 having the above described structure receives the incident light beam at the light beam entrance end of the rod member 16 with light rays being directed at various angles. Therefore, the incident and reflecting angles on the inner surfaces of the rod member 16 vary, but all the incident angles are determined so that the light beam is totally reflected at the glass/air interface. The light beam emerging from the rod member 16 enters the hollow prism-shaped member 17 where it is reflected from the inner reflecting surfaces at various angles before emerging from the light beam exit end of the hollow prism-shaped member 17. The rod integrator 15 serves to homogenize the light beam intensity in a cross-section orthogonal to the optical axis of the rod integrator when the light beam emerges from the light beam exit end because of the various reflections from the inner surfaces.

The rod integrator 15 has a hollow light beam exit end so that no scratches are present at the exit end and no dust adheres to the hollow exit end. Thus, no images of scratches or dust are formed on the composite mirror surface of the DMD 22 that is at the conjugate point to the light beam exit end in relation to the relay lenses 18a and 18b. The rod member 16 has a light beam reflectivity of nearly 100% at its side walls. Thus, it is preferred that the rod member 16 occupies the larger part of the entire rod integrator 15. In the present embodiment, the rod integrator 15 is positioned between the projection lens 24 and the totally reflecting prism 21 without blocking the projection light beam. In some cases, the rod integrator 15 may be longer than the length necessary to homogenize the light beam intensity of the illumination light beam. In such a case, it is preferred that any extra length be occupied by the rod member 16 that causes almost no reflection loss.

It is further preferred that a leaky ray shielding member for preventing light leakage from the optical path of the illumination light beam be provided at least at one of the following places along the rod integrator 15: near the light beam entrance end; near the side walls; and near the light beam exit end. With the configuration of the present invention, the rod integrator 15 is placed comparatively near the projection lens 24, and the converging point of the light beam from the light source is also located nearby.

Figure 5:
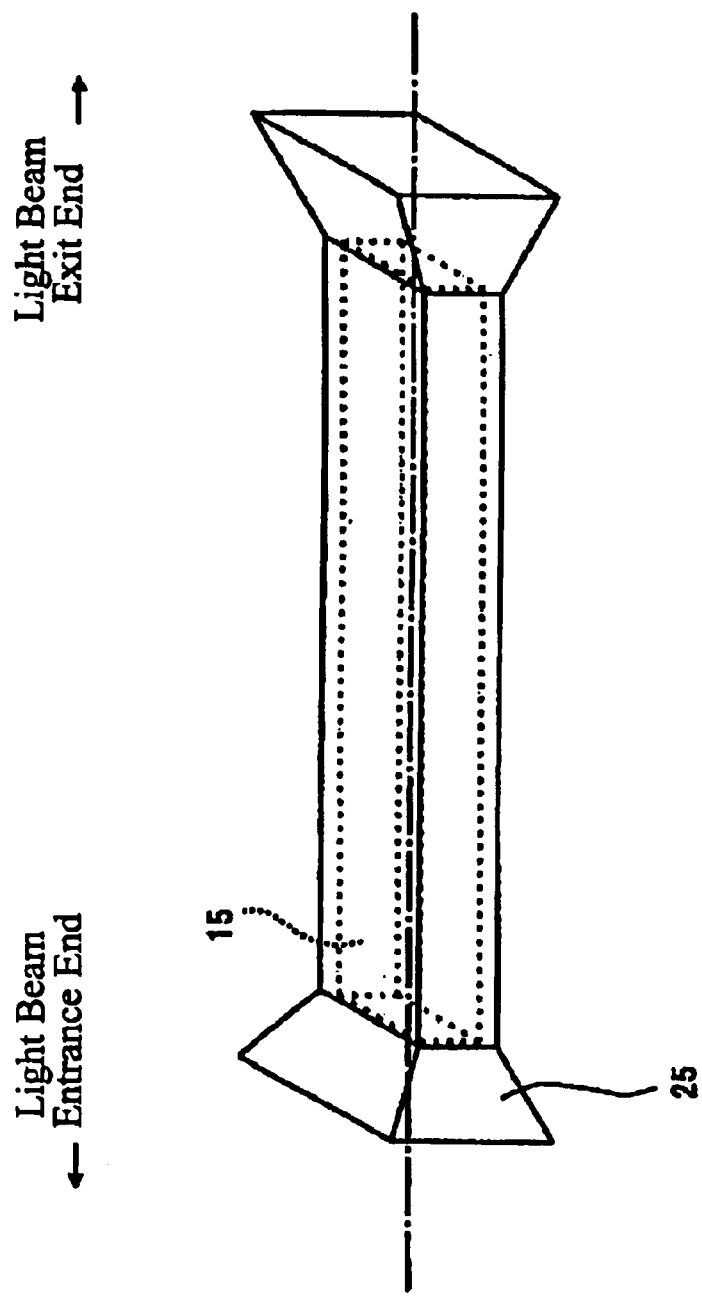
FIG. 5 shows a perspective view of a rod integrator having a leaky ray shielding member for use in a projection-type image display device of the present invention.

In order to minimize unwanted light from entering the projection lens 24, it is preferred that a leaky ray shielding member be used to eliminate unwanted stray light. However, the leaky ray shielding member near the side walls has to be placed so that it does not interfere with the total reflection on the inner walls of the rod member 16. The most effective arrangement is one where a leaky ray shielding member is provided at all of: near the light beam entrance end; near the side walls; and near the light beam exit end. FIG. 5 illustrates an example of such a leaky ray shielding member. The rod integrator 15 (indicated by the dotted lines) is totally covered with a leaky ray shielding member 25 near the light beam entrance end, near the side walls, and near the light beam exit end.

In the present embodiment, the light beam from a light source is reflected forward by the parabolic mirror reflector 11 and is converged by the condenser lens 13 which has at least one aspherical surface before it enters the rod integrator 15. Prior art condenser lenses for this purpose include two spherical lenses. However, a single aspheric lens may be used to reduce the cost and size of the illumination optical system.

The invention being thus described, it will be obvious that the same may be varied in many ways. For example, the embodiment described above uses a parabolic reflector. However, the reflector is not restricted to such as shape, and may instead be ellipsoidal. In such a case, a light source is positioned at one focal point of an ellipsoidal reflector so that the illumination light reflected forward by the ellipsoidal reflector converges at the other focal point of the ellipsoidal mirror. Thus, when an ellipsoidal mirror is used, a condenser lens as used to converge the light flux from a parabolic reflector can be eliminated.

The embodiment described above uses a hybrid integrator. However, various rod-type integrators may be used instead to homogenize the light beam intensity of the illumination light flux. A rod integrator, such as a glass rod, that is positioned with its axis parallel to the optical axis may be used alone instead of using a hybrid integrator, as described above, for guiding the light beam that enters the light beam entrance end to the light beam exit end while totally reflecting it on the side walls. Where a solid rod-type integrator alone is used, a reflectivity of very nearly 100% at the side walls is obtained. Thus, substantially no reflection loss is observed even if the integrator is made longer than needed to homogenize the light beam intensity of the illumination light beam. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A projection-type image display device comprising:
   a light source;
   converging optics for converging light from the light source, the converging optics including a reflector for condensing light from the light source;
   a rod integrator having a first optical axis that receives the collected light and that includes a light beam entrance end near a point where the collected light converges and a light beam exit end at the opposite end of the rod integrator arranged so that the light exiting the exit end of the rod integrator forms a light beam with a homogeneous cross-section in a plane perpendicular to the first optical axis;
   light beam deflecting means for deflecting the light beam from the rod integrator;
   a digital micromirror device that receives said light beam from said light beam deflecting means and that includes an array of micromirrors arranged in a plane, each micromirror being rotatable between two positions for modulating said light beam by selectively reflecting incident light in a first direction or in a second direction depending on a picture signal that switches the positions of the micromirrors between the two positions;
   a projection lens having a second optical axis for projecting the modulated light beam from the digital micromirror device toward a projection screen;
   light beam separating means for directing said light beam from said light beam deflecting means to the digital micromirror device and for directing the light beam directed to the digital micromirror device and modulated by the digital micromirror device along the second optical axis;
   wherein
   the first optical axis and the second optical axis are skewed relative to one another; and
   the rod integrator is positioned between said light beam separating means and said projection lens in the direction of the second optical axis and is outside the optical path of the modulated light beam from the digital micromirror device as the modulated light beam passes from the digital micromirror device to the projection lens.

2. The projection-type image display device of claim 1, wherein the projections of said first optical axis and said second optical axis onto a common plane are substantially orthogonal to one another.

3. The projection-type image display device of claim 1, and further including a leaky ray shielding member for shielding light leakage at least at one of the following places on the rod integrator: near the light beam entrance end of the rod integrator, near the side walls of the rod integrator, and near the light beam exit end of the rod integrator.

4. The projection-type image display device of claim 2, and further including a leaky ray shielding member for shielding light leakage at least at one of the following places on the rod integrator: near the light beam entrance end of the rod integrator, near the side walls of the rod integrator, and near the light beam exit end of the rod integrator.

5. The projection-type image display device of claim 1, wherein the rod integrator includes a solid rod member with an entrance end, an exit end, and side walls, and the rod integrator directs the light entering its entrance end to its exit end while totally reflecting the light on its side walls.

6. The projection-type image display device of claim 2, wherein the rod integrator includes a solid rod member with an entrance end, an exit end, and side walls, and the rod integrator directs the light entering its entrance end to its exit end while totally reflecting the light on its side walls.

7. The projection-type image display device of claim 3, wherein the rod integrator includes a solid rod member with an entrance end, an exit end, and side walls, and the rod integrator directs the light entering its entrance end to its exit end while totally reflecting the light on its side walls.

8. The projection-type image display device of claim 4, wherein the rod integrator includes a solid rod member with an entrance end, an exit end, and side walls, and the rod integrator directs the light entering its entrance end to its exit end while totally reflecting the light on its side walls.

9. The projection-type image display device of claim 5, wherein the rod integrator further includes a hollow member provided on the light exit end of said solid rod member for guiding the light from the exit end of said solid rod member.

10. The projection-type image display device of claim 6, wherein the rod integrator further includes a hollow member provided on the light exit end of said solid rod member for guiding the light from the exit end of said solid rod member.

11. The projection-type image display device of claim 7, wherein the rod integrator further includes a hollow member provided on the light exit end of said solid rod member for guiding the light from the exit end of said solid rod member.

12. The projection-type image display device of claim 8, wherein the rod integrator further includes a hollow member provided on the light exit end of said solid rod member for guiding the light from the exit end of said solid rod member.

13. The projection-type image display device of claim 1, wherein said reflector is a parabolic reflector, a condenser lens is provided that includes at least one aspheric lens surface, and the condenser lens converges light from said light source that is collected by said parabolic reflector.

14. The projection-type image display device of claim 2, wherein said reflector is a parabolic reflector, a condenser lens is provided that includes at least one aspheric lens surface, and the condenser lens converges light from said light source that is collected by said parabolic reflector.

15. The projection-type image display device of claim 3, wherein said reflector is a parabolic reflector, a condenser lens is provided that includes at least one aspheric lens surface, and the condenser lens converges light from said light source that is collected by said parabolic reflector.

16. The projection-type image display device of claim 4, wherein said reflector is a parabolic reflector, a condenser lens is provided that includes at least one aspheric lens surface, and the condenser lens converges light from said light source that is collected by said parabolic reflector.

17. The projection-type image display device of claim 5, wherein said reflector is a parabolic reflector, a condenser lens is provided that includes at least one aspheric lens surface, and the condenser lens converges light from said light source that is collected by said parabolic reflector.

18. The projection-type image display device of claim 6, wherein said reflector is a parabolic reflector, a condenser lens is provided that includes at least one aspheric lens surface, and the condenser lens converges light from said light source that is collected by said parabolic reflector.

19. The projection-type image display device of claim 7, wherein said reflector is a parabolic reflector, a condenser lens is provided that includes at least one aspheric lens surface, and the condenser lens converges light from said light source that is collected by said parabolic reflector.

20. The projection-type image display device of claim 8, wherein said reflector is a parabolic reflector, a condenser lens is provided that includes at least one aspheric lens surface, and the condenser lens converges light from said light source that is collected by said parabolic reflector.

* * * * *

UNITED STATES PATENT AND TRADEMARK OFFICE
CERTIFICATE OF CORRECTION

PATENT NO.   : 6,783,249 B2
DATED        : August 31, 2004
INVENTOR(S)  : Yoneyama It is certified that error appears in the above-identified patent and that said Letters Patent is hereby corrected as shown below:

<u>Column 4,</u>
Line 39, change "as-shown" to -- as shown --.

Signed and Sealed this

Nineteenth Day of April, 2005

JON W. DUDAS
*Director of the United States Patent and Trademark Office*